United States Patent Office 3,275,096
Patented Sept. 27, 1966

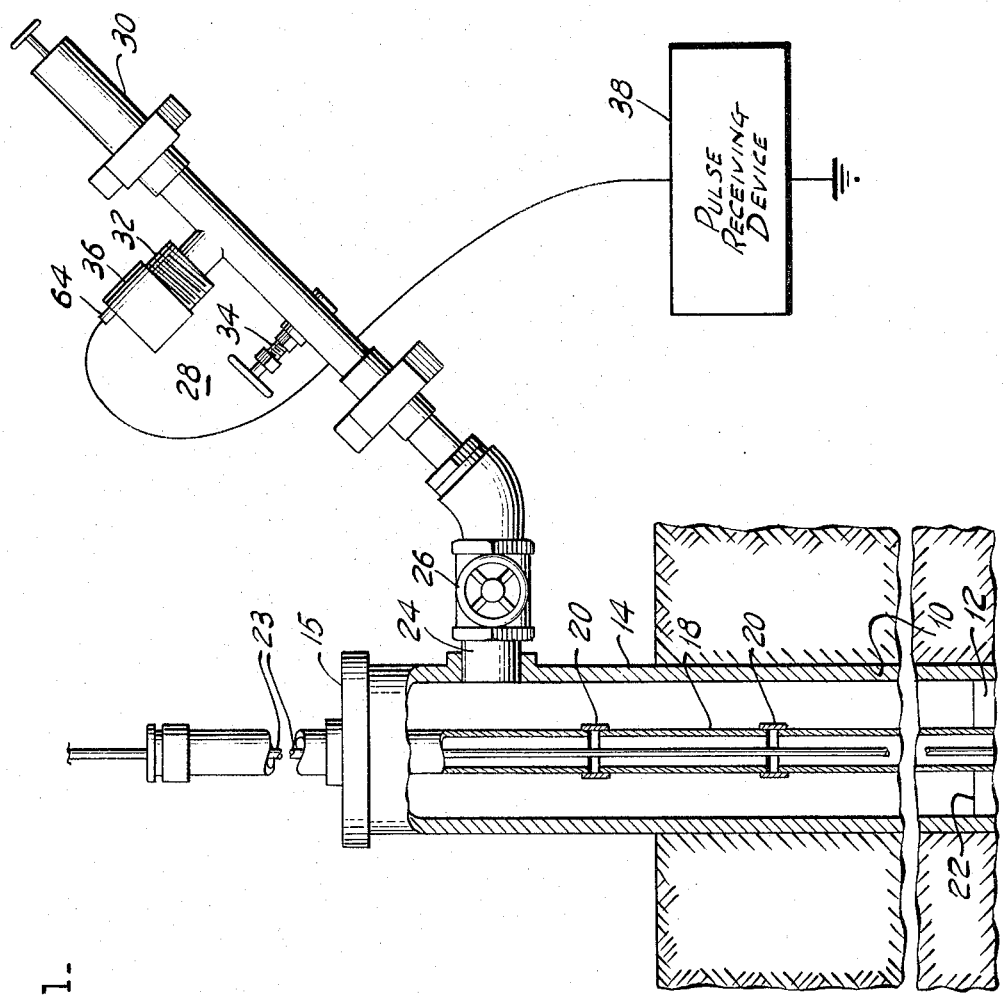

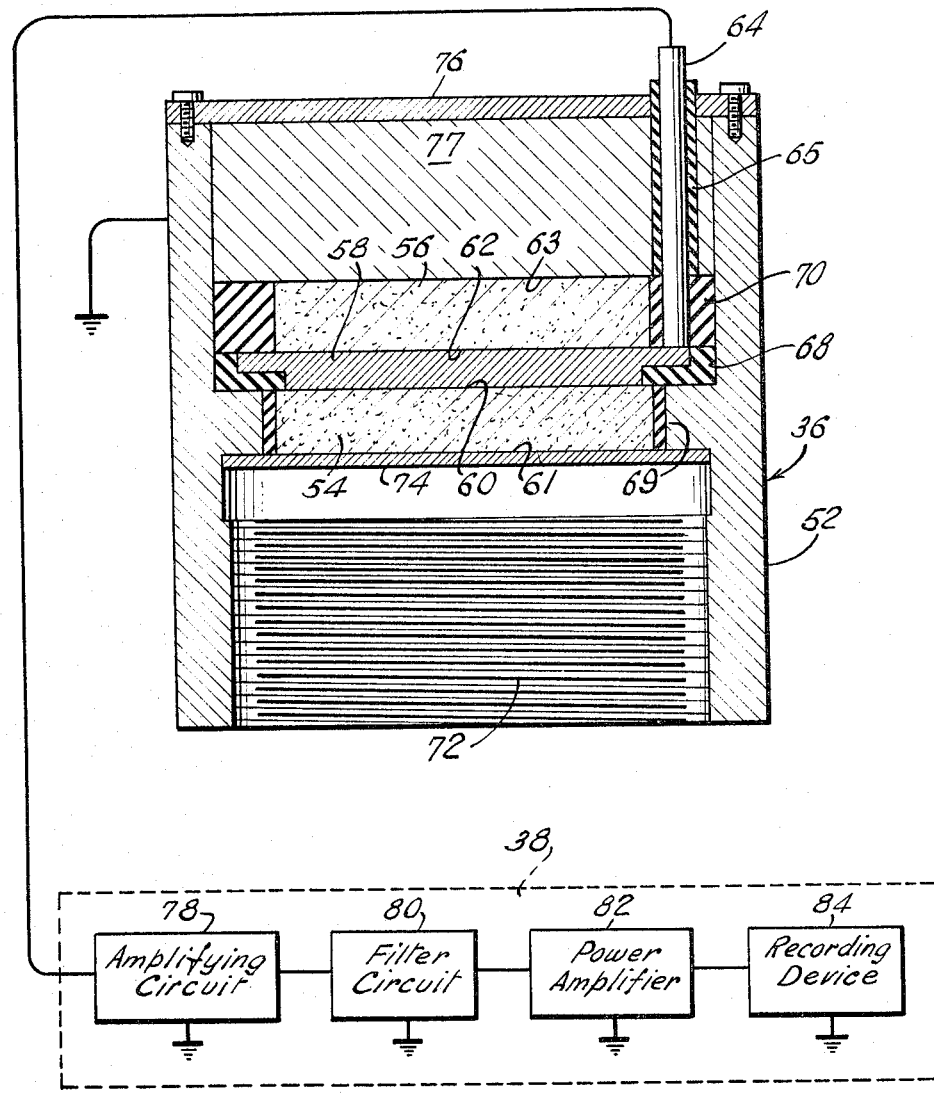

3,275,096
TWO CRYSTAL MICROPHONE ASSEMBLY FOR WELL SOUNDING
Arthur H. Lord, Bellaire, Tex., assignor to Texaco Inc., New York, N.Y., a corporation of Delaware
Filed Apr. 10, 1963, Ser. No. 272,508
4 Claims. (Cl. 181—.5)

This is a continuation in part of application Serial No. 784,107, filed December 31, 1958, now abandoned.

This invention relates to a microphone assembly and more particularly to a microphone assembly which is particularly suitable for use in an acoustical well sounding device employed for acoustically determining the depth of the liquid level in a well.

In many instances it is desirable to know as accurately as possible the depth to the liquid level in a well, since this information is useful in determining the potential of a well, the size and type of pumping apparatus which is necessary, the location at which the pump should be placed in the well and the proper operation of the pump.

Well sounders of the present type generally comprise pressure-proof pipes, fittings, and instruments which are mechanically connected to the well under test. Such instruments essentially include a cartridge firing device, a microphone assembly, a recorder, and a bleeding valve.

Typical well sounders record directly on chart paper sound pulses produced upon the firing of a blank cartridge in the annular space between the tubing and the casing of a well. Sound pulses are reflected by tubing collars, casing joints, tubing catchers and any other constriction or enlargement of the gas column in the well above the liquid level. The depth to the liquid level can be determined by multiplying the number of tubing collars or casing joints by the average tubing or casing length. The distance to the liquid level is often many thousands of feet and the sound pulses generated by the explosion caused by the cartridge in the firing device or gun must be of sufficient intensity to travel the distance to the liquid level and back to the microphone without nullifying attenuation.

In a large percentage of the field applications of the acoustical well sounding device its performance is hampered and the results are proportionally poorer because of the background noise. While some of the noise is due to the changes in pressure within the annular space between the casing and tubing, it is caused largely by undesirable mechanical vibrations, such as may be produced by pumping equipment operating at adjacent wells, which are detected by the microphone and introduced into the amplifier along with the desired signals. In order to produce a usable record it often is necessary to reduce the gain of the amplifier so that the over all sensitivity is low enough to exclude the background noise, much of which is in the same frequency range as the desired acoustical reflections. In many wells this results in a fading and eventual loss of reflections at depth such that a large portion of the record cannot be interpreted except by extrapolation.

In accordance with the present invention, an improved microphone assembly which may be readily used in acoustical well sounding devices is provided which comprises two electro-acoustical transducers, the first transducer being mounted so as to readily receive the acoustical reflections transmitted through the gas column in the well and the second transducer being mounted so as to be shielded or isolated from the acoustical reflections transmitted through the gas column in the well but which is subject to the same mechanical vibrations or shock excitation as the first transducer. By connecting the two transducers in parallel but with reversed polarity any excitation which is common to both will be electrically canceled in their common output, while excitation of only one transducer will produce the usual electric signal. Since only the first transducer is exposed to acoustical reflections from within the well, these will appear unimpaired in the amplifier of the device. The cancelling effect of the second transducer will materially reduce the background noise providing a more favorable signal-to-noise ratio and will thereby substantially increase the usable sensitivity level of the acoustical well sounding device when used on a so-called "noisy" well.

In order that the invention may be more clearly and readily carried into effect, it will now be described more fully with reference to the accompanying drawing in which:

FIGURE 1 is a schematic showing of the acoustical well sounding device connected to well apparatus, and FIGURE 2 illustrates schematically the structural elements and the electrical circuitry of the well sounding device according to the invention.

Referring to the drawing in more detail, there is shown in FIGURE 1 a bore hole 10 traversing subsurface formations from which liquid is flowing into the borehole to form therein a liquid column 12 having a liquid level 22. The borehole 10 is lined with a casing 14 having a casing head 15 and a string of tubing 18 having collars 20 extends downwardly into the borehole to a depth below the liquid level 22. A string of pump rods 23 is shown extending downwardly through the tubing 18, although this forms no essential part of the present invention. A pipe 24 having a valve 26 is connected to the casing 14 so as to communicate with the annular space between the casing 14 and the tubing 18. The acoustical well sounding device 28 is shown connected to the casing 14 through the pipe 24. The acoustical well sounding device 28 comprises a firing device 30 of any suitable type which may be operated to produce a sharp explosive pulse and thus a pressure wave within the pipe 24 and the casing 14, by firing a blank cartridge or the like, and a bleeder valve 34 to permit the release of pressure in the well sounding equipment after the valve 26 in the pipe 24 is closed so that the acoustical well sounding device may be removed from the well apparatus.

In order to detect the reflected sound waves from the tubing collars 20 and the liquid level 22, a microphone assembly 36 is provided in the well sounding device 28. The assembly 36 is connected to a tap 32 mounted at the lower end of the firing device 30 so as to be in communication with the gas column in the annular space between the casing 14 and the tubing 18. The output from the microphone 36 is applied to a pulse receiving device 38 where it may be recorded on a suitable chart or tape.

Referring more particularly to FIGURE 2, the microphone assembly 36 comprises a microphone housing 52 within which are mounted a first crystal 54 and a second crystal 56, preferably, each being in the form of a disc of barium titanate, separated by a compression plate 58 which acts as a mechanical buffer and as a common electrical connector between the two crystals 54 and 56. The first face 60 of the first crystal 54 and the first face 62 of the second crystal 56 which are in contact with the compression plate 58 have opposite polarities and are connected to the signal receiving device 38 through a spring loaded contact 64 which is surrounded by an electrically insulating material sleeve 65. The opposite second faces 61 and 63 of the two crystals 54 and 56 are electrically connected to the microphone housing 52 so as to be at a common ground potential. The compression plate 58 is insulated electrically from the housing by three insulating rings 68, 69 and 70. A chamber 72 is provided in the assembly 36 so as to communicate with the annular space between the casing 14 and the tubing 18 through the pipe 24. A thin diaphragm 74, preferably made of a conductive metal, is secured to the housing 52 in good electrical contact therewith and is disposed at one end of the chamber 72 so as to contact the second face 61 of the first crystal 54. The diaphragm 74 in contact with and covering the face 61 of crystal 54 which would otherwise be exposed to the gas in the well, not only serves to protect the first crystal 54 but also greatly increases the sensitivity of the microphone assembly 36 to the pulses passing through chamber 72. An end cap 76 is attached to the microphone housing 52 so as to retain a solid electrically conductive material backing member 77, the first and second crystals 54 and 56, the compression plate 58 and the insulating rings 68, 69 and 70 within the microphone housing 52. It is to be noted that the backing member 77, the end cap 76, the compression plate 58, the diaphragm 74 and the housing 52 are all made of electrically conductive material so that there are two crystal circuits in parallel electrically between the contact 64 and the grounded housing 52. The pulse receiving device 38 may be of any suitable type. For example, it may comprise an amplifying circuit 78 connected to the output of the microphone 36 and adapted to amplify pulses having a wide range of frequencies. In addition it may comprise a filter circuit 80 which may selectively pass desired frequencies, and a power amplifier 82 for producing strong pulses for the recording device 84.

In the operation of the acoustical well sounding device a pressure wave is produced by the firing device 30 which is transmitted through the pipe 24 into the interior of the casing 14 toward the liquid level 22 of the liquid column 12. As the pressure wave travels downwardly through the casing 14 portions thereof are reflected upwardly by the tubing collars 20 until the main wave reaches the liquid level 22 from which the main portion of the wave is reflected upwardly. The upwardly reflected waves pass out of the casing 14 through the pipe 24 and the chamber 72 in the housing 52 to the diaphragm 74 so as to excite the first crystal 54 wherein voltage pulses corresponding to the received pressure waves are produced. These voltage pulses are then applied to the pulse receiving device 38 where they may be recorded on a moving chart or tape.

It can be readily seen that since the second crystal 56 is acoustically shielded or isolated from the pressure waves passing through the gas column in the chamber 72, it will not become excited by these waves to an appreciable extent, yet the two crystals are subjected to the same mechanical vibrations and shock excitations since they are mounted within the same housing 52 in a similar manner. Therefore, this extraneous noise produces in each of the crystals similar voltage pulses which, due to the parallel electrical connection of the two crystals with reversed polarities, are electrically canceled before they are applied to the pulse receiving device 38.

It should be understood that the shunt effect of the parallel unexcited crystals is negligible as compared with the amplifier input impedance since the electro-acoustical, for example, barium titanate, crystal is a high impedance element.

Accordingly, it can be seen that the present invention provides a simple microphone assembly having a substantially improved signal-to-noise ratio, and an acoustical well sounding device, wherein the amplifier sensitivity can be increased to a level which will permit a smaller charge to be used in the firing device for wells having a given liquid level depth or which will permit the investigation of wells having a greater liquid level depth.

While many modifications and variations of the invention as hereinbefore set forth may be made without departing from the spirit and scope thereof, it will be understood therefore that only such limitations should be imposed as are indicated in the appended claims.

I claim:

1. A microphone assembly comprising a housing having a chamber at one end thereof, first and second piezo-electric crystal transducers, said first crystal transducer being disposed to receive acoustic energy passing through said chamber, a compression plate interposed between said first and second transducers so as to act as a buffer and as an electrical interconnection between said first and second crystal transducers, an output terminal electrically connected to said compression plate, means for insulating said terminal from said housing, the faces of each of said crystal transducers contacting said compression plate having opposite polarities, annular support means for insulating said compression plate from said housing, and a diaphragm disposed between said first transducer and said chamber so as to cover said first transducer and to electrically connect the other face of said first transducer to said housing, said second transducer being mounted within said housing so as to provide electrical contact between the other face of said second transducer and said housing.

2. A microphone assembly comprising a housing having a chamber at one end thereof adapted for communication with the interior of a deep well, a first crystal transducer comprising a barium titanate crystal having two faces and mounted in said housing with one face thereof toward said chamber, an electrically conductive diaphragm located in contact with said one face of said first crystal and being exposed to said chamber for receiving acoustic energy passing therethrough, said diaphragm being in electrical contact with said housing, an electrically conductive compression plate securely mounted in fixed relation with said housing and having one face thereof in contact with the other face of said barium titanate crystal the mounting for said compression plate including means for electrically insulating said plate from said housing, an electrical circuit connector mounted on but electrically insulated from said housing and in electrical contact with said compression plate, a second crystal transducer comprising a second barium titanate crystal having two faces and being mounted in said housing with one face thereof in contact with the other face of said compression plate, said first and second crystals being mounted with reversed polarities relative to one another and backing means in contact with the other face of said second crystal for solidly mounting said second crystal and for making electrical contact between said other face thereof and said housing.

3. A microphone assembly comprising a housing, first and second piezo-electric crystals mounted within said housing, said first crystal being disposed to receive acoustic energy passing through a given medium, a compression plate within said housing and disposed between said crystals in contact with one face of each of said crystals, an output terminal electrically connected to said compression plate, electrical insulating means for insulating said compression plate and said output terminal from said housing, said crystals being mounted within said housing with faces of opposite polarities in contact with said compression plate, the other face of each of said crystals being in electrical contact with said housing.

4. A microphone assemby comprising a housing having a chamber at one end thereof adapted for communication with the interior of a deep well, a first crystal transducer comprising a barium titanate crystal having two faces and mounted in said housing with one face thereof toward said chamber, an electrically conductive diaphragm located in contact with said one face of said first crystal and being exposed to said chamber for receiving acoustic energy passing therethrough, said diaphragm being in electrical contact with said housing, an electrically conductive compression plate securely mounted in fixed relation with said housing and having one face thereof in contact with the other face of said barium titanate crystal the mounting for said compression plate including means for electrically insulating said plate from said housing, an electrical circuit connector mounted on said housing and in electrical contact with said compression plate, an insulating sleeve surrounding said circuit connector for electrically insulating the connector from said housing, a second crystal transducer comprising a second barium titanate crystal having two faces and being mounted in said housing with one face thereof in contact with the other face of said compression plate, said first and second crystals being mounted with reversed polarities relative to one another, and backing means in contact with the other face of said second crystal for solidly mounting said second crystal and for making electrical contact between said other face thereof and said housing.

References Cited by the Examiner

UNITED STATES PATENTS

| | | | |
|---|---|---|---|
| 2,250,496 | 7/1941 | Postlethwaite | 310—8.7 |
| 2,636,134 | 4/1953 | Arons et al. | |
| 2,835,735 | 5/1958 | Moen | 179—1 |
| 2,914,686 | 11/1959 | Clements et al. | 310—9.1 |

BENJAMIN A. BORCHELT, *Primary Examiner.*

M. F. HUBLER, *Assistant Examiner.*